United States Patent [19]

Westland et al.

[11] Patent Number: 5,350,528
[45] Date of Patent: * Sep. 27, 1994

[54] METHOD OF SUPPORTING FRACTURES IN GEOLOGICAL FORMATIONS AND HYDRAULIC FLUID COMPOSITION FOR SAME

[75] Inventors: John A. Westland, Bothell, Wash.; Glenn S. Penny, Duncan, Okla.; R. Scott Stephens, Auburn; Alan R. Winslow, Tacoma, both of Wash.

[73] Assignee: Weyerhaeuser Company, Tacoma, Wash.

[*] Notice: The portion of the term of this patent subsequent to Apr. 23, 2008 has been disclaimed.

[21] Appl. No.: 861,801
[22] PCT Filed: Dec. 11, 1990
[86] PCT No.: PCT/US90/07318
§ 371 Date: Jun. 12, 1992
§ 102(e) Date: Jun. 12, 1992

Related U.S. Application Data

[63] Continuation-in-part of Ser. No. 450,360, Dec. 13, 1989, Pat. No. 5,009,797.

[51] Int. Cl.$^5$ ............................................. E21B 43/26
[52] U.S. Cl. .................................. 252/8.551; 166/283; 166/308
[58] Field of Search ................. 252/8.551; 435/101; 166/283, 308

[56] References Cited

U.S. PATENT DOCUMENTS

| | | | |
|---|---|---|---|
| 3,740,360 | 6/1973 | Nimerick | 260/17.4 |
| 4,067,389 | 1/1978 | Savins | 166/246 |
| 4,462,917 | 7/1984 | Conway | 252/8.551 |
| 4,514,309 | 4/1985 | Wadhwa | 252/8.551 |
| 4,629,575 | 12/1986 | Weibel | |
| 4,879,228 | 11/1989 | Mays et al. | 435/101 |
| 4,905,761 | 3/1990 | Bryant | 166/246 |
| 5,009,797 | 4/1991 | Penny et al. | 252/8.551 |

FOREIGN PATENT DOCUMENTS

| | | | |
|---|---|---|---|
| 8908148 | 9/1989 | PCT Int'l Appl. | C12P 19/04 |
| 2153834 | 8/1985 | United Kingdom | C08B 11/20 |
| 2244503 | 12/1991 | United Kingdom | |

OTHER PUBLICATIONS

"Microfibrillated Cellulose, A New Cellulose Product; Properties, Uses, and Commercial Potential," Turbak, et al., Journal of Applied Polymer Science: Applied Polymer Symposium 37, 815–827 (1983).

Primary Examiner—Gary Geist
Attorney, Agent, or Firm—Stoel Rives Boley Jones & Grey

[57] ABSTRACT

The addition of relatively small quantities of a bacterial cellulose to hydraulic fracturing fluids improves their rheological properties for hydraulic fracturing of geological formations. Proppant suspension is markedly improved and friction loss through well casings is significantly reduced, resulting in lower pumping energy requirements. Computer models also indicate that formation fractures will be propagated for greater distances as will the propped portion of the fracture. Normally only about 0.60–1.8 g of bacterial cellulose per liter of fracturing fluid is needed. A preferred bacterial cellulose is one made in agitated fermentors using mutation resistant strains of a bacterium from the genus Acetobacter.

20 Claims, 1 Drawing Sheet

METHOD OF SUPPORTING FRACTURES IN GEOLOGICAL FORMATIONS AND HYDRAULIC FLUID COMPOSITION FOR SAME

This is a continuation-in-part of application No. 07/450,360, filed Dec. 13, 1989, now U.S. Pat. No. 5,009,797, issued Apr. 23, 1991.

TECHNICAL FIELD

The present invention relates to methods for fracturing geological formations in the region of hydrocarbon bearing zones in order to stimulate production of desired hydrocarbon fluids. The present invention also relates to hydraulic fracturing fluids which demonstrate improved rheological properties for delivering a proppant into fractures in order to maintain them in a highly permeable condition for improved hydrocarbon recovery. The invention further relates to methods for preparation and use of such a fluid.

BACKGROUND OF INVENTION

Hydraulic fracturing of oil bearing formations has been practiced commercially for many years. Conventional hydraulic fracturing techniques involve pumping a fluid at a sufficiently high pressure and volumetric rate through a well hole lined with a steel pipe and into a hydrocarbon bearing zone to cause cracks to form and propagate within the surrounding geological formation. Although both oil-based and water-based fracturing fluids are available, water-based fracturing fluids are generally more economical, and they offer greater control over a broader range of physical properties than oil-based fluids. Water-based fracturing fluids are now generally preferred by the hydrocarbon retrieval industry. The following discussion and the present invention is directed to water-based fracturing fluids.

Fracturing fluids generally contain several components. Among the most important components are a proppant, which is a granular solid material, and a gellant, which controls rheological properties of the fracturing fluid. Proppants are typically chosen from highly rounded natural silica sand and from ceramic materials such as alumina. Alumina is preferred whenever compressive forces are expected to be high. Numerous other additives found in fracturing fluids include pH buffers, surfactants, clay stabilizers, biocides, and fluid-loss additives. Many of these specific chemicals used in the fracturing process are described in *Chemicals in Petroleum Exploration and Production II, North American Report and Forecasts to* 1993, Colin A. Houston and Associates, Inc., Mamaroneck, N.Y. (1984).

A primary purpose of fracturing fluids is to distribute the proppant in cracks formed and propagated during fracturing, causing them to remain open after the pressure is released. Uniform distribution of proppant in cracks tends to greatly increase the permeability of a geological formation, especially of a very tight formation, and enable a greater recovery and higher flow rate of hydrocarbons contained within the formation.

Hydraulic fracturing has become a relatively predictable practice. The orientation and lengths of cracks can, under certain circumstances, be substantially predetermined and controlled. The *Petroleum Engineering Handbook*, H. B. Bradley, ed., Society of Petroleum Engineers, Richardson, Tex., Chap. 55 (1987) presents a useful background discussion of hydraulic fracturing.

While the term "gellant" is in common use in the hydrocarbon recovery industry in connection with fracturing fluids, the term should not be taken literally to mean that fracturing fluid gellants form conventional nonflowing gels. Fracturing fluid gellants may be more appropriately classified as viscosifiers and rheology control agents. A primary purpose of the gellant is to maintain the proppant in suspension during fluid preparation, pumping, and distribution into the well hole and cracks generated within a hydrocarbon bearing formation. Gellants therefore should function under diverse shear conditions. For example, several hundred thousand liters of fracturing fluid may be injected into a well at pumping rates as high as 7950 L/min. Ideally, the viscosity of the fluid should be low during fluid mixing and pumping to minimize the energy required during these operations. The viscosity should be high enough, however, so that the proppant does not fall out of suspension and is delivered to its desired location. High temperatures in hydrocarbon bearing zones further complicate the rheological properties and requirements of fracturing fluids.

The hydrocarbon recovery industry generally employs fracturing fluids that exhibit reduced viscosity as shear conditions increase. The relatively higher viscosity exhibited at lower shear conditions helps to maintain the proppant in suspension, while lower viscosity exhibited under higher shear conditions improves fracturing fluid flow rate and distribution.

Fluid behavior characteristics of a fracturing fluid can be described by the following equation:

$$\tau = K\gamma^n,$$

where $\tau$ is the shear stress, K is the consistency index, $\gamma$ is the shear rate, and n is the fluid behavior index. When the value of n is 1, the fluid is Newtonian; when the value of n is less than 1, the fluid is thixotropic; and when the value of n is greater than 1, the fluid is dilatant. Thixotropic fluids having values of n around 0.4 to 0.8 are typically preferred for fracturing fluids. Newtonian fluids do not generally carry proppant.

Gellants are usually based on water soluble derivatives of common polysaccharide materials such as guar gum, cellulose, or xanthan. Hydroxypropyl guar (HPG) and carboxymethylhydroxypropyl guar (CMHPG) are two common guar derivatives that are frequently employed as gellants. Cellulosic materials commonly employed as gellants include hydroxyethyl cellulose, carboxymethylhydroxyethyl cellulose, and hydroxypropylmethyl cellulose.

Well conditions, particularly well temperatures, have significant bearing on the choice of gellant. Hydroxypropyl guar is most useful at lower temperatures, and carboxymethylhydroxethyl cellulose is frequently employed under at higher temperature conditions. Hydroxyethyl cellulose and xanthan have intermediate temperature tolerances.

Recovery from deeper wells that typically involves higher operating temperatures presents challenges and requires greater control over the rheological properties of fracturing fluids. In general, increasing the gellant concentration in the fracturing fluid results in increased viscosity. Practical, economical, and operational considerations, however, limit the amount of gellant that can be introduced to a fracturing fluid to increase its viscosity. Additionally, excessive gellant polymer loading may result in poor mixing efficiency and substantial frictional resistance. Crosslinking agents have been employed to circumvent some of these gellant limitations.

Crosslinking agents are now conventionally used in fracturing fluids to modify their rheological properties. Some crosslinking agents operate on a timedelayed basis to increase the fluid viscosity at the bottom of a wall, after the fluid has passed through the great bulk of the well casing. Crosslinkers that are currently used include polyvalent metal salts that form chelates, such as borates, aluminates, titanates, chromates, and zirconates. Different crosslinkers exhibit different pH and temperature limitations that affect their usefulness under certain fracturing conditions.

After the fracturing fluid has been distributed in the well and the associated fracture formations, the non-proppant fracturing fluid residue is removed from the formation, while the proppant remains distributed in the fractures. Oxidizing agents and enzymes that attack the gellant are commonly used to hasten removal of the fracturing fluid residue. Temperature conditions may be determinative of the gel-breaking mechanism to be employed. For example, enzymes are useful at temperatures of up to about 50° C. Oxidants such as sodium or ammonia perfulate and calcium or sodium hypochlorite are useful at temperatures of up to about 80° C. In situ well temperatures above about 135° C. may be sufficient to cause gel breakdown as a result of thermal degradation without the aid of a catalyst.

Although substantial research efforts have been devoted to developing hydraulic fracturing fluids that exhibit the desired stability and rheological properties, the results have not been entirely satisfactory. The present invention is therefore directed to fracturing fluids that provide improved rheological properties and control under various fracturing conditions.

SUMMARY OF THE INVENTION

Accordingly, it is an object of the present invention to provide novel hydraulic fracturing fluid compositions exhibiting improved thixotropic rheological properties, and to provide methods for making and using such fluids.

It is a further object of the present invention to provide hydraulic fracturing fluids having increased stability and viscosity and, in general, exhibiting rheological properties that promote the uniform suspension of proppant particles and thereby improve geological fracturing techniques.

It is another object of the present invention to provide hydraulic fracturing fluids that contain an adjuvant which imparts temperature stability and improved crosslinking properties to fracturing fluids.

It is still another object of the present invention to provide fracturing fluids having relatively low concentrations of gellant and crosslinker components while maintaining desireable rheological properties.

The introduction of bacterially produced cellulose to hydraulic fracturing fluids comprising conventional gellants confers several advantageous properties. In particular, high viscosities are achieved, apparently without concomitant increases in friction under flow conditions. Additionally, fracturing fluids incorporating bacterially produced cellulose exhibit substantially reduced proppant settling rates, even at fracturing fluid viscosities equivalent to those achieved using only conventional gellants.

Bacterial cellulose also imparts significant advantages to crosslinked fracturing fluids. These advantages include increased resistance to both temperature induced thinning and physical shear, substantial insensitivity to solvent salt concentration, and enhanced rehealing ability. Bacterial cellulose even lowers the pH at which fracturing fluids can crosslink in the presence of certain crosslinking agents.

Bacterial cellulose may be incorporated in fracturing fluids comprising conventional gellants, including guar, hydroxypropyl guar, carboxymethylhydroxypropyl guar, xanthan, hydroxyethyl cellulose, carboxymethylhydroxyethyl cellulose, and hydroxypropylmethyl cellulose. These gellants are generally present in concentrations of about 0.60 to 7.2 g/L of mixed fracturing fluid, and more commonly in amounts of about 2.4 to 6.0 g/L fracturing fluid. The improvement observed and attributed to the introduction of bacterial cellulose requires relatively small amounts of bacterial cellulose; e.g., in the range of about 0.12 to 4.8 g/L of mixed fracturing fluid, and preferably in the range of about 0.60 to 1.8 g/L of mixed fracturing fluid. Proppant is typically introduced in amounts of about 120 to 960 g/L fracturing fluid. All concentrations recited herein are measured on a dry weight basis unless otherwise indicated.

Bacterial cellulose suitable for use in methods and compositions of the present invention includes cellulose produced by various species of Acetobacter organisms. Bacterial cellulose is distinguishable from plant cellulose in that it is a reticulated fibrillar material having very high surface area. It has very different properties in this regard from purified, plant-derived cellulose, e.g., wood pulps. The bacterial cellulose preferred for use in the methods and compositions of the present invention is produced by a strain of the Acetobacter bacterium that is resistant to mutation to non-cellulose producing types and is cultured under agitated culture conditions.

The above-mentioned and additional features of the present invention and the manner of obtaining them will become apparent, and the invention will be best understood by reference to the following more detailed description read in conjunction with the accompanying drawings.

DESCRIPTION OF THE PREFERRED EMBODIMENTS

Certain strains of microorganisms of the genus Acetobacter produce large quantities of cellulose when they are grown under agitated culture conditions. Acetobacter is characteristically a gram-negative, rod-shaped aerobic bacterium. Its metabolism is respiratory rather than fermentative.

Cellulose chains or fiber strands are synthesized at the bacterial surface at sites external to the cell membrane during agitated culture conditions. The cellulose fiber strands produced by these microorganisms, although chemically similar to cellulose produced from wood pulp, differ in a number of important respects. An important difference is that cellulose fiber strands produced under agitated culture conditions by Acetobacter are about two orders of magnitude narrower, having diameters of about 0.10 to 0.20 microns, than typical wood pulp cellulose fibers. Characteristics of cellulose-producing bacteria and preferred growth and agitated culture conditions are fully described in U.S. Pat. No. 4,863,565, entitled "Sheeted Products Formed From Reticulated Microbial Cellulose."

Taxonomists have been unable to agree upon a consistent classification of the cellulose producing species of Acetobacter. For example, the cellulose producing microorganisms listed in the 15th Edition of the catalog of the American Type Culture Collection under accession numbers 10245, 10821, and 23769 are classified both as *Acetobacter aceti*, subspecies *xylinum*, and as *Acetobacter pasteurianus*. For the purposes of the present invention, bacterial cellulose produced by any species or variety of bacterium within the genus Acetobacter that produces cellulose is suitable, and bacterial cellulose produced by any species of the genus Acetobacter under agitated cell culture conditions is preferred. The bacterial cellulose used in the following specific examples was produced from a strain of Acetobacter aceti var. xylinum having properties similar to or grown as a subculture of ATCC Accession No. 53-263, deposited Sep. 13, 1985, under the terms of the Budapest Treaty. The bacteria may be cultured under conditions similar to those described below.

The base medium preferred for use with cellulose-producing microbial cultures is referred to as CSL medium. A suitable CSL medium comprises:

| Ingredient | Final Conc. (mM) |
|---|---|
| $(NH_4)_2SO_4$ | 25 |
| $KH_2PO_4$ | 7.3 |
| $MgSO_4$ | 1.0 |
| $FeSO_4$ | 0.013 |
| $CaCl_2$ | 0.10 |
| $Na_2MoO_4$ | 0.001 |
| $ZnSO_4$ | 0.006 |
| $MnSO_4$ | 0.006 |
| $CuSO_4$ | 0.0002 |
| Vitamin mix | 10 mL/L |
| Carbon source | As later specified |
| Corn Steep liquor | As later specified |
| Antifoaming agent | 0.01% v/v |

The final pH of the medium is preferably about 5.0±0.2.

A suitable vitamin mix may be formulated as follows:

| Ingredient | Conc. mg/L |
|---|---|
| Inositol | 200 |
| Niacin | 40 |
| Pyridoxine HCl | 40 |
| Thiamine HCl | 40 |
| Ca Pantothenate | 20 |
| Riboflavin | 20 |

-continued

| Ingredient | Conc. mg/L |
|---|---|
| p-Aminobenzoic acid | 20 |
| Folic acid | 0.2 |
| Biotin | 0.2 |

The carbon source generally comprises monosaccarides or mixtures thereof, such as glucose and fructose, disaccharides such as sucrose, and mixtures of mono- and disaccharides. The carbon source may also be supplied as a complex mixture of sugars, such as molasses or plant biomass hydrolysates such as wood hydrolysate, straw, sorghum, and the like. Other carbohydrate derivatives, such as mannitol and sorbitol may also serve as carbon sources in culture media. The carbon source is typically provided in concentrations of about 0.5% to about 7.0% (w/v). The final pH of the medium is about 5.0±0.2.

Corn steep liquor, yeast extract, casein hydrolysate, ammonium salts or other nitrogen-rich substances may be used as a general source of nitrogen, amino acids, minerals and vitamins. Corn steep liquor is preferred, and suitable concentrations thereof range from about 0.1% to about 10% (v/v). Cell culture media comprising about 5% (v/v) corn steep liquor is supplemented during the fermentation run with additional aliquots of corn steep liquor. Corn steep liquor varies in composition, depending upon the supplier and mode of treatment. A product obtained as Lot E804 from Corn Products Unit, CPC North America, Stockton, Calif., may be considered typical and has the following composition.

| Major Component | % |
|---|---|
| Solids | 43.8 |
| Crude protein | 18.4 |
| Fat | 0.5 |
| Crude fiber | 0.1 |
| Ash | 6.9 |
| Calcium | 0.02 |
| Phosphorous | 1.3 |
| Nitrogen-free extract | 17.8 |
| Non-protein nitrogen | 1.4 |
| NaCl | 0.5 |
| Potassium | 1.8 |
| Reducing sugars (e.g. dextrose) | 2.9 |
| Starch | 1.6 |

The bacteria were first multiplied as a preseed culture using CSL medium with 4% (w/v) glucose as the carbon source and 5% (w/v) CSL. Cultures were grown in 100 mL of the medium in a 750 mL Falcon #3028 tissue culture flask at 30° C. for 48 hours. The entire contents of the culture flask was blended and used to make a 5% (v/v) inoculum of the seed culture. Preseeds were streaked on culture plates to check for homogeneity and possible contamination. Seed cultures were grown in 400 mL of the above-described medium in 2 L baffled flasks in a reciprocal shaker at 125 rpm at 30° C. for two days. Seed cultures were blended and streaked as before to check for contamination before further use.

The following description is typical of laboratory scale production of bacterial cellulose. However, the process has been scaled up for fermentors as large as 20,000 L and the bacterial cellulose used in the following examples has been produced in this larger equipment. There is no discernable difference in the bacterial cellulose product formed in laboratory and commercial-size reactors.

Bacterial cellulose was formed in a continuously stirred 14 L Chemap fermentor at 30° C. and ambient pressure using an initial 12 L culture volume inoculated with 5% (v/v) of the seed cultures. An initial glucose concentration of 32 g/L in the medium was supplemented during the 72-hour fermentor run with an additional 143 g/L added intermittently during the run. In similar fashion, the initial 2% (v/v) CSL concentration was augmented by the addition of an amount equivalent to 2% by volume of the initial volume at 32 hours and 59 hours. Cellulose concentration reached about 12.7 g/L during the fermentation. Throughout the fermentation, dissolved oxygen was maintained at about 30% air saturation.

Following fermentation, cellulose was dewatered. The remaining cellulose was extracted with a basic solution at a pH of approximately 13 or higher at 60° for 2 hours. After extraction, the cellulose was washed with deionized water to remove residual alkali and bacterial cells. The purified microbially produced cellulose was maintained in wet condition for further use. It will be clear to one of ordinary skill in the art that various modifications may be made to the above-described methods of producing bacterial cellulose. The bacterial cellulose produced under stirred or agitated culture conditions as described above, (hereafter referred to as "BAC") has a microstructure quite different from that produced by bacteria grown in conventional static cultures. BAC is a reticulated product forming a substantially continuous, three-dimensional network of branching, interconnected fiber strands.

The bacterial cellulose prepared as above by the agitated fermentation has filament widths much smaller than softwood pulp fibers or cotton fiber. Typically these filaments are about 0.05 to 0.20 microns in width with indefinite length due to the continuous network structure. A softwood fiber averages about 30 microns in width and 2 to 5 mm in length while a cotton fiber is about half this width and about 25 mm long.

EXAMPLE 1

Viscosity Characteristics Gellant/BAC Fracturing Fluids

The effect of adding BAC to hydraulic fracturing fluids was determined using two different methods for measuring viscosity and at high and low shear rates. Low shear viscosities are relevant during the fracture settling process, while higher shear viscosity values reflect the environment during the pumping process.

In this set of experiments, the BAC was added in combination with several polymeric fracturing fluid gellants, specifically hydroxypropyl guar (HPG), carboxymethylhydroxypropyl guar (CMHPG), and hydroxyethyl cellulose (HEC). Ratios of gellant to BAC were varied using 2.4 to 4.8 g/L of gellant to 0.60 to 1.8 g/L of BAC. Preferred ratios were 4.8 g of HPG and CMHPG, and 3.6 g of HEC, each with 1.2 g of BAC per liter of fluid. The mixtures were prepared in a Waring Blender using water as a solvent and mixing for 20 minutes at a medium speed. BAC dispersions in water generally require shear energy to build viscosity.

The viscosity of the resulting fluids under low shear conditions was measured using a Brookfield Viscometer, Model RV, with a number 1 or 2 spindle at 0.3 rpm, approximating a shear rate of $<20$ sec$^{-1}$. Brookfield Viscometers are available from Brookfield Engineering Laboratories, Inc., Stoughton, Mass. Measurements were made at temperatures of 26.7° and 65.6° C. The experimental results are shown below in Table 1. The results demonstrate that significantly higher viscosities are observed when BAC is added to a fracturing fluid comprising HPG or CMHPG. The low temperature trial for the fracturing fluid comprising HEC and BAC also demonstrated a relatively high viscosity.

TABLE 1

| Fracturing Fluid | g/L | Temp., °C. | Viscosity mPa · s |
|---|---|---|---|
| HPG | 4.8 | 26.7 | 390 |
| HPG | 4.8 | 65.6 | 160 |
| CMHPG | 4.8 | 26.7 | 250 |
| CMHPG | 4.8 | 65.6 | 125 |
| HPG + BAC | 4.8 + 1.2 | 26.7 | 1180 |
| HPG + BAC | 4.8 + 1.2 | 65.6 | 640 |
| CMHPG + BAC | 4.8 + 1.2 | 26.7 | 840 |
| CMHPG + BAC | 4.8 + 1.2 | 65.6 | 620 |
| HEC + BAC | 3.6 + 1.2 | 26.7 | 880 |
| HEC + BAC | 3.6 + 1.2 | 65.6 | 150 |

In a second experiment designed to measure fracturing fluid viscosities under higher shear conditions, fracturing fluid samples prepared as above were tested using a Fann 50 Viscometer with a standard bob rotating at 40, 80 and 120 rpm. Viscosities were calculated at shear rates of 40, 170, and 511 sec$^{-1}$. Tests were conducted at 21.2°, 37.8°, 51.7°, and 65.6° C. The Fann Viscometer is available from Fann Instrument Co., Houston, Tex. The results are presented in Table 2 and indicate that BAC reduces the apparent viscosity of fracturing fluids at higher shear rates. This is a desirable property for fracturing fluids, since it provides reduced viscosity during mixing and at high shear conditions during fracture formation.

TABLE 2

| Fracturing Fluid | g/L | Temp., °C. | Viscosity (mPa · s) at Shear Rates of | | |
|---|---|---|---|---|---|
| | | | 40/sec | 170/sec | 511/sec |
| HPG | 4.8 | 21.2 | 140 | 63 | 35 |
| | | 57.7 | 101 | 50 | 29 |
| | | 65.6 | 81 | 43 | 27 |
| HPG + BAC | 4.8 + 1.2 | 21.2 | 86 | 43 | 26 |
| | | 37.8 | 69 | 37 | 23 |
| | | 51.7 | 46 | 29 | 20 |
| | | 65.6 | 35 | 24 | 17 |
| CMHPG | 4.8 | 21.2 | 108 | 51 | 29 |
| | | 51.7 | 83 | 43 | 25 |
| CMHPG + BAC | 4.8 + 1.2 | 21.2 | 104 | 45 | 24 |
| | | 37.8 | 91 | 40 | 22 |
| | | 51.7 | 72 | 34 | 20 |
| | | 65.6 | 49 | 27 | 18 |
| HEC + BAC | 3.6 + 1.2 | 21.2 | 51 | 25 | 18 |
| | | 37.8 | 18 | 15 | 11 |
| | | 51.7 | 5 | 8 | 10 |

EXAMPLE 2

Proppant Transport Properties of Gellant/BAC Fracturing Fluids

The ability of gellant/BAC fracturing fluids to impede the settling of single sand grains was used as a measure of the proppant transport properties of the fracturing fluids made and studied in the previous example. Settling rates were measured using 20-25 mesh Jordan Northern White sand at 26.7° and 65.6° C. Jordan sand is supplied by Unimin, New Canaan, Conn. The proppant settling apparatus consisted of a graduated cylinder filled with the appropriate fracturing fluid suspension and placed in a constant temperature bath.

Single sand grains were placed in the cylinder and observed until the settling velocity as measured in mm/min, was constant. Several replicate tests were run at each condition. The results shown in Table 3 clearly indicate that fracture fluids containing BAC exhibit negligible sand settling. Corresponding fracturing fluids that did not contain BAC had very high settling rates, particularly at the higher temperature.

TABLE 3

| Fracturing Fluid | g/L | Temp., °C. | Single Grain Sand Settling mm/min |
|---|---|---|---|
| HPG | 4.8 | 26.7 | 25 |
| HPG | 4.8 | 65.6 | 250 |
| CMHPG | 4.8 | 26.7 | 188 |
| CMHPG | 4.8 | 65.6 | 231 |
| HPG + BAC | 4.8 + 1.2 | 26.7 | 1.0 |
| HPG + BAC | 4.8 + 1.2 | 65.6 | 1.1 |
| CMHPG + BAC | 4.8 + 1.2 | 26.7 | 1.5 |
| CMHPG + BAC | 4.8 + 1.2 | 65.6 | 3.3 |
| HEC + BAC | 3.6 + 1.2 | 26.7 | 0.18 |
| HEC + BAC | 3.6 + 1.2 | 65.6 | 0.83 |

EXAMPLE 3

Breakdown Characteristics of Gellant/BAC Fracturing Fluids

Fracturing fluids should also display ease of breakdown of the gellant to facilitate removal of the fracturing fluid residue after the proppant is in place. Gellant breakdown facilitates fracture cleanup and resumption of oil and/or gas flow. Introduction of oxidizers and enzymes are two of the most common methods employed for accomplishing gellant breakdown.

Breakdown characteristics of gellant/BAC fracturing fluids comprising 4.8 g/L HPG and CMHPG, respectively, with 1.2 g/L BAC were measured at temperatures of 37.8° and 65.6° C. The test procedure entailed mixing the relevant viscosity breakers with the fracturing fluid in a Fann 35 cell, bringing the cell to temperature, and monitoring the viscosity over a 24 hour time period.

In a first set of tests, calcium hypochlorite (65% available chlorine) was utilized as an example of an oxidizing breaker. Conventional breakdown techniques require about 0.030 to 1.2 g/L calcium hypochlorite, most commonly in the neighborhood of about 0.060 to 0.12 g/L. The initial viscosities of the gellant/BAC fracturing fluids were about 25 mPa·s. Effective breakage was seen within 1 hour at a hypochlorite level of 0.12 g/L. A second set of tests was run using the enzyme CELLUCLAST ™ available from Novo Laboratories, Inc., Franklinton, N.C., at a concentration of 0.05 to 8 mL/L.

The target viscosity for the treated fluids, i.e., the desired viscosity after breakdown, is as low as possible, and at least under about 10 mPa·s. Data generated as a result of the oxidizer and enzymatic breakdown tests are presented in Tables 4 and 5. The target viscosity was reached for all gellant/BAC fracturing fluids in no longer than 6 hours.

TABLE 4

| Temp. = 37.8° C. | Viscosity (mPa · s) | | | |
|---|---|---|---|---|
| | Hypochlorite @ 0.12 g/L | | Celluclast @ 0.05 mL/L | |
| Time, hrs | HPG/BAC | CMHPG/BAC | HPG/BAC | CMHPG/BAC |
| 0 | 25 | 25 | 25 | 25 |
| 1 | 11 | 9 | 11 | 13 |
| 2 | 11 | 8 | 8 | 11 |
| 4 | 11 | 8 | 5 | 7 |
| 6 | 10 | 8 | 4 | 7 |
| 24 | 10 | 8 | 1 | 3 |

TABLE 5

| Temp. = 37.8° C. | Viscosity (mPa · s) | | | |
|---|---|---|---|---|
| | Hypochlorite @ 0.12 g/L | | Celluclast @ 0.05 mL/L | |
| Time, hrs | HPG/BAC | CMHPG/BAC | HPG/BAC | CMHPG/BAC |
| 0 | 25 | 25 | 25 | 25 |
| 1 | 6 | 4 | 3 | 5 |
| 2 | 6 | 4 | 1 | 3 |
| 4 | 6 | 4 | 1 | 3 |
| 6 | 5 | 3 | 1 | 1 |
| 24 | 4 | 3 | 1 | 1 |

EXAMPLE 4

Temperature Stability of Gellant/BAC Fracturing Fluids.

Temperature sensitivity profiles were measured for fracturing fluids comprising 4.8 g/L HPG with and without 1.2 g/L BAC. The viscosity was measured using a Brookfield Viscometer at 0.5 rpm at target temperatures of from about 20° to 87.8° C. Viscosity measurements for the HPG fracturing fluid fell rapidly as the temperature increased. Viscosity measurements for HPG/BAC fracturing fluid decreased initially until a temperature of about 48.9° C. was reached, and then appeared to level off at about 12,000 mPa·s. Fracturing fluids having a viscosity of 12,000 mPa·s are acceptable and exhibit adequate single grain sand settling rates.

EXAMPLE 5 pH Stability of Gellant/BAC Fracturing Fluids

The pH of the fracturing fluids comprising 4.8 g/L HPG with and without 1.2 g/L BAC was varied from 2 to 12 and the viscosity was measured at each pH using a Brookfield Viscometer at 0.5 rpm. pH variations were found to have no significant impact on the viscosity of the HPG fracturing fluids and only slightly increased viscosity of the HPG/BAC fracturing fluids.

EXAMPLE 6

Effect of Increasing Salt Concentration on Gellant/BAC Fracturing Fluids

Figure 1:
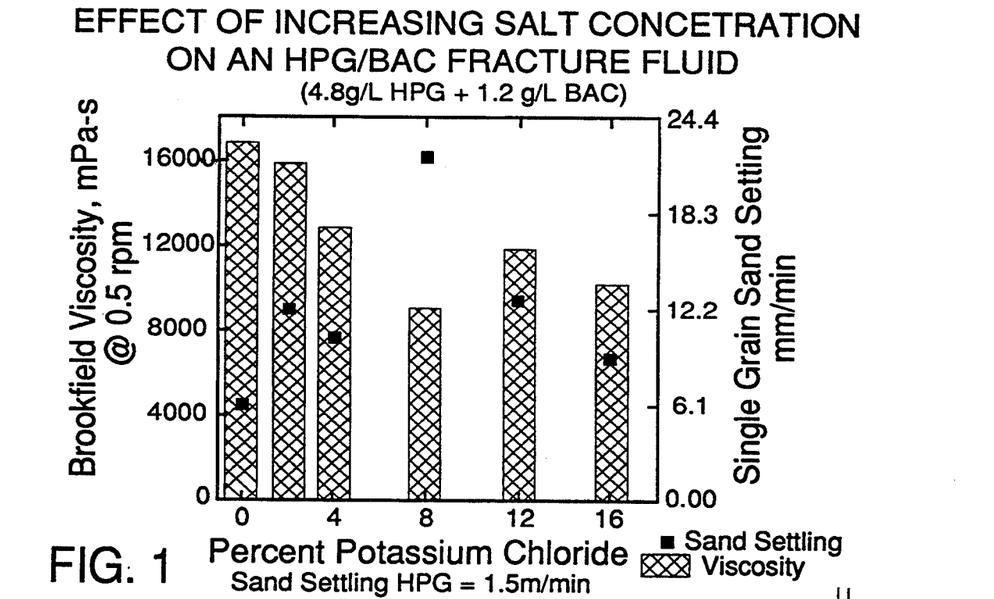
FIG. 1 is a bar graph showing the viscosity and single grain sand settling rate of HPG/BAC fracturing fluids containing from 0 to 16% KCl.

The concentration of KCl in fracturing fluids comprising 4.8 g/L HPG with 1.2 g/L BAC was varied from 0 to 16%. The Brookfield viscosities and single grain sand settling rates were measured at specified salinity increments, as expressed by percentage potassium chloride. The results of these experiments are shown in FIG. 1. The viscosity decreased slightly as the KCl concentration approached about 8%, and then appeared to level off. The sand settling rate increased slightly or remained level at higher potassium chloride concentrations. Several mono-, di-, and tri-valent metal salts, such as chlorides of Na, K, Ca, Fe(II), Fe(III), and Al(III) were used to make gellant/BAC fracturing fluids. The viscosities of HPG/BAC fracturing fluids were not significantly affected by metal salt concentrations of 4%. These results are significant because they demonstrate that liquids having a high salinity, such as those present at well sites, can be used to make the fracturing fluids.

EXAMPLE 7

Sustained Temperature Stability and Fluid Behavior Index of Gellant/BAC Fracturing Fluids HPG fluids containing 6.0 g/L HPG and 0, 1.2, or 2.4 g/L BAC were subjected to 148.9° C. and a shear of 40 sec$^{-1}$ for 60 minutes. Tables 6 and 7, respectively, present the viscosities and behavior index values of these fluids at 21.1° C. before and after heating, as well as at 15 minute intervals at 148.9° C. The values in Table 6 show that the BAC containing fluids maintained significantly greater viscosity during extended heating and physical shear and were able to reheal to a much greater extent than the nonBAC, HPG control fluid.

TABLE 6

| Temp. | Time in Minutes | Viscosity (mPa · s) at HPG 6.0 g/L | | |
|---|---|---|---|---|
| | | 0 g/L BAC | 1.2 g/L BAC | 2.4 g/L BAC |
| (21.1° C.) | −10 | 241 | 233 | 214 |
| (148.9° C.) | 0 | 38 | 72 | 87 |
| (148.9° C.) | 15 | 21 | 67 | 80 |
| (148.9° C.) | 30 | 18 | 61 | 65 |
| (148.9° C.) | 45 | 13 | 54 | 60 |
| (148.9° C.) | 60 | 12 | 58 | 53 |
| (21.1° C.) | 80 | 85 | 271 | 176 |

Table 7 shows that the BAC containing fluids exhibit a significantly lower n', demonstrating that they have better thixotropic properties for hydraulic fracturing than the nonBAC, HPG control fluid.

TABLE 7

| Temp. | Time in Minutes | n' at HPG 6.0 g/L | | |
|---|---|---|---|---|
| | | 0 g/L BAC | 1.2 g/L BAC | 2.4 g/L BAC |
| (21.1° C.) | −10 | 0.40 | 0.35 | 0.32 |
| (148.9° C.) | 0 | 0.78 | 0.55 | 0.42 |
| (148.9° C.) | 15 | 0.75 | 0.55 | 0.43 |
| (148.9° C.) | 30 | 0.74 | 0.57 | 0.46 |
| (148.9° C.) | 45 | 0.94 | 0.56 | 0.47 |
| (148.9° C.) | 60 | 0.97 | 0.49 | 0.45 |
| (21.1° C.) | 80 | 0.51 | 0.35 | 0.40 |

EXAMPLE 8

Formation Fracture Simulation

Computer simulations were run on several gellant and gellant/BAC combination fracturing fluids to estimate fracture geometry and production ratio increases. A titanate crosslinked gellant fracturing fluid (HPG/Ti) was also investigated. The program used, FRACA-NAL, takes into account fluid leakoff, temperature gradients in the well, rheology of the fracturing fluid, pumping schedule, and expected pressures in the well. Results are shown in Table 8.

BAC containing fracturing fluids show a much higher predicted production increase than fracturing fluids that do not include BAC because the BAC containing fluids create longer fractures and distribute proppant throughout most of the fracture zone.

TABLE 8

| Fracturing Fluid g/L | Created Length, m | Propped Length, m | Production Increase Ratio |
|---|---|---|---|
| HPG 4.8 | 99 | 45 | 3.5 |
| HPG/Ti 4.8/.6 | 80 | 233 | 3.1 |
| HPG/BAC 4.8/1.2 | 30 | 395 | 6.7 |
| CMHPG 4.8 | 127 | 283 | 3.8 |
| MHPG/BAC 4.8/1.2 | 235 | 363 | 5.5 |
| HEC/BAC 3.6/1.2 | 343 | 390 | 7.9 |

EXAMPLE 9

Friction Simulation Tests

Flow friction simulation tests were conducted by circulating a hydraulic fracturing fluid without proppant through a 6.1 m length of 9.5 mm diameter stainless steel tubing using a Jaeco Intensifier pump. The pressure drop across the tubing loop was measured at various pumping rates. These tests demonstrate that the addition of BAC to fracturing fluids comprising conventional gellants results in a very significant reduction in flow friction. Table 9 compares the percentage friction reduction of several fracturing fluids containing BAC compared to the flow friction of pure water. In all cases a 60+% friction reduction was achieved by the gellant/BAC fracturing fluid containing no additional friction reducers.

TABLE 9

| Fracturin Fluid | Friction Reduction, % |
|---|---|
| 4.8 g/L CMHPG + 1.2 g/L BAC | 68 |
| 3.6 g/L HEC + 1.2 g/L BAC | 62 |
| 1.8 g/L CMHEC + 0.6 g/L BAC | 61 |
| 4.8 g/L HPG + 1.2 g/L BAC | 60 |

EXAMPLE 10

Viscosity Characteristics of Borate Crosslinked Gellant/BAC Fracturing Fluids

Gellant/BAC fracturing fluids were prepared using water as a solvent in a Waring Blender run at medium speed for 15 minutes. A concentration of 0.48 g/L boric acid was added and thoroughly mixed with the gellant-/BAC mixture. The pH of the fracturing fluid was adjusted to 10 with a solution of 3% sodium hydroxide. The viscosities of the resulting gels were measured with a Brookfield Viscometer, Model RV, at 0.5 rpm, at a shear rate of <20 sec$^{-1}$.

Table 10 shows the effect on viscosity of varying HPG/BAC ratios in borate crosslinked fracturing fluids. Although the ratios of BAC to HPG were varied from 0.3 to 1.2 g/L BAC to 2.4 to 6.0 g/L HPG, Table 10 presents results from a narrower range within those concentrations. A preferred ratio of BAC to HPG was experimentally determined to be about 0.6 g/L BAC to 3.6 g/L HPG.

The results presented in Table 10 show significantly increased viscosities for crosslinked fracturing fluids containing BAC, compared to those that do not contain BAC. Similar viscosity increases were found for crosslinked BAC fracturing fluids with the other gellants tested. The results also show that equivalent or better viscosities can be obtained at lower HPG levels by the addition of BAC. The viscosity was unmeasurable when more than 0.6 g/L of boric acid was used.

TABLE 10

| HPG (g/L) | Viscosity (mPa · s) | | |
|---|---|---|---|
| | BAC (g/L) | | |
| | 0 | 0.3 | 0.6 |
| 2.4 | 64,000 | 105,000 | 134,000 |
| 3.6 | 174,000 | 248,000 | 272,000 |
| 4.8 | 184,000 | — | — |

EXAMPLE 11

Temperature Stability of Borate Crosslinked Gellant/BAC Fracturing Fluids

One of the limitations of conventional borate crosslinked fracturing fluids gels is that desired viscosity properties and proppant transport abilities may be lost as a result of modest increases in temperature. A borate crosslinked HPG fracturing fluid, for example, typically loses its ability to suspend proppant at about 65.6° C. Accordingly, the viscosity of a borate crosslinked HPG fracturing fluid was compared to that of a borate crosslinked HPG/BAC fracturing fluid at temperatures between 23.9 and 85° C.

Fracturing fluids were prepared in the manner described above with concentrations of 4.8 g/L HPG, with or without 1.2 g/L BAC, and 0.48 g/L boric acid. The fracturing fluids were heated to 85° C. and allowed to cool in a controlled temperature bath. Viscosities were measured using a Brookfield Viscometer at 0.5 rpm.

The experimental results presented in Table 11 show that the addition of BAC to borate crosslinked HPG fracturing fluids significantly extends the useful temperature range of such fracturing fluids. The borate crosslinked fracturing fluids containing BAC maintained useful levels of viscosity up to the test limit of 85° C.

TABLE 11

| Temperature °C. | Viscosity (mPa · s) | |
|---|---|---|
| | HPG + BAC 4.8 g/L + 1.2 g/L | HPG 4.8 g/L |
| 25.6 | 264,000 | 49,000 |
| 30.6 | 180,000 | 37,800 |
| 37.8 | 224,000 | — |
| 48.9 | 120,000 | 8,200 |
| 61.1 | 180,000 | 4,600 |
| 74.4 | 48,000 | — |

TABLE 11-continued

| Temperature °C. | Viscosity (mPa · s) | |
|---|---|---|
| | HPG + BAC 4.8 g/L + 1.2 g/L | HPG 4.8 g/L |
| 85.0 | 17,600 | 780 |

EXAMPLE 12

POLYBOR ™ Crosslinked Fracturing Fluids

Most conventional borate crosslinked hydraulic fracturing fluids are effective only above a pH of about 9.5. POLYBOR ™, (disodium octaborate tetrahydrate) a borate crosslinking agent made by U.S. Borax and Chemical Co., is reasonably soluble and can be used at a pH of about 8.5. POLYBOR ™ has consequently been proposed as a crosslinking agent for soluble gellants, but it generally exhibits poor crosslinking properties at pH 8.5 and does not yield a usable gel.

Table 12 shows the viscosity of various POLYBOR ™ crosslinked HPG/BAC fracturing fluids. HPG and HPG/BAC fracturing fluids were prepared as described in earlier examples. POLYBOR ™ was added at a concentration of 0.6 g/L while mixing the fluids for an additional minute. The viscosities of the resulting gels were measured with a Brookfield Viscometer, Model RV, at 0.5 rpm, approximating a shear rate of <20 sec$^{-1}$.

Table 12 shows significantly increased viscosities for POLYBOR ™ crosslinked HPG fracturing fluids containing BAC. The viscosities obtained with BAC are of sufficient magnitude to provide usable hydraulic fracturing gels at a lower pH than is currently practiced.

TABLE 12

| POLYBOR ™ Crosslinked HPG (g/L) | Viscosity (mPa · s) | | |
|---|---|---|---|
| | BAC (g/L) | | |
| | 0 | 0.3 | 0.6 |
| 2.4 | 180 | 4,780 | 5,120 |
| 3.6 | 1,160 | 20,600 | 28,000 |
| 4.8 | 6,440 | 34,600 | 67,000 |

POLYBOR ™ crosslinked fracturing fluids comprising various concentrations of CMHPG and Guar, respectively, with and without BAC were also prepared and measured to determine their viscosity. The results were similar to those presented above, with POLYBOR ™ crosslinked fracturing fluids containing BAC having significantly increased viscosities.

EXAMPLE 13

Proppant Transport Properties of POLYBOR ™ Crosslinked Fracturing Fluids

The POLYBOR ™ crosslinked fracturing fluids described in Example 12 were tested to measure their ability to retain proppant suspended under dynamic conditions. A hydraulic fracturing shear simulation apparatus was designed to simulate both high shear pumped flow down a well bore and lower shear flow into a fracture area. In a preferred example, 2.75 kL of fracturing fluid containing 4.2 g/L HPG, 2.4 g/L BAC, and 0.6 g/L POLYBOR ™ in 2% KCl was mixed for 30 minutes in a 2.84 kL tank using a moyno pump and a gate valve to create a 6.9×10$^5$ Pa pressure drop. Proppant in the form of 20/40 mesh Jordan sand was added at the end of the mixing period. After thorough mixing, the gel was pumped at a rate of 95 L/minute through the hydraulic fracturing simulation apparatus.

The simulation apparatus was designed with two portions, a well hole shear simulator and a formation temperature shear simulator. The well hole simulator included a length of 914.4 m of $2.54 \times 10^{-2}$ m diameter coiled tubing and was connected to the formation simulator, which included a length of 97.5 m of $2.54 \times 10^{-2}$ m diameter tubing immersed in ethylene glycol heated to 51.7° C. The formation simulator emptied into a slot flow device having dimensions $3.56 \times 10^{-1}$ m high and 6.1 m long, where the proppant settling was measured under dynamic conditions. Half the length of the slot flow device was $8.5 \times 10^{-3}$ m wide and the other half was $6.4 \times 10^{-3}$ m wide. One side of the slot device was constructed of plexiglass and overlaid by a grid, and the other side was constructed of aluminum and had heaters to maintain temperature.

Figure 2A:
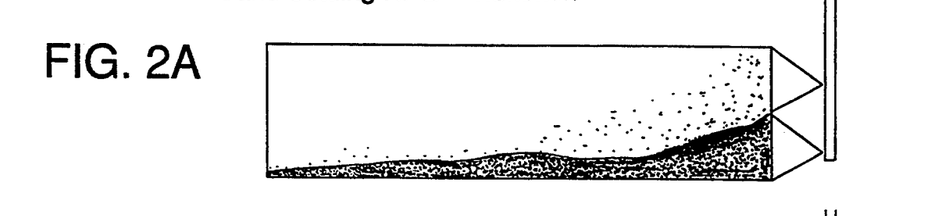
FIGS. 2A and 2B are diagrammatic representations of experimental test results showing proppant suspension in POLYBOR TM crosslinked fracturing fluids at pH 8.5 at 51.7° C. The fracturing fluid depicted in FIG. 2B additionally comprises bacterial cellulose, while the fracturing fluid depicted in FIG. 2A does not incorporate bacterial cellulose.
Figure 2B:
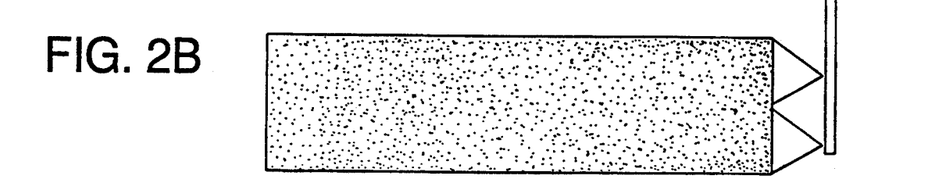

The dynamic proppant settling properties were determined by analysis of video tape recordings of the proppant suspension in the slot flow device. FIG. 2A is a representation of the slot flow device containing POLYBOR TM crosslinked HPG fracturing fluid. FIG. 2B is a representation of the slot flow device containing a POLYBOR TM crosslinked HPG/BAC fracturing fluid. FIGS. 2A and 2B show very graphically that the addition of BAC to the POLYBOR TM crosslinked fracturing fluid significantly enhances proppant suspension and inhibits proppant settling.

EXAMPLE 14

Viscosity Characteristics of Zirconate Crosslinked Fracturing Fluids

Zirconate crosslinked fracturing fluids are typically employed in high temperature wells. In general, zirconate crosslinked fracturing fluids are sensitive to down hole pumping, and may be unable to reheal. Consequently, zirconate crosslinked fracturing fluids substantially lose their ability to transport proppant. Experimental results suggest that BAC may extend and augment the use of zirconates to crosslink water soluble gellants.

Fracturing fluids having the following compositions were prepared: 2.4 to 4.8 g/L HPG and 0 to 2% $ZrO_2$, with and without 0.3 to 1.2 g/L BAC. The crosslinking agent was introduced in the form of zirconyl acetate, available from Magnesium Elektron, Inc., Flemington, N.J. The viscosities of the zirconate crosslinked fracturing fluids were measured using a Brookfield Viscometer at 0.5 rpm. The results are shown in Table 13.

TABLE 13

| Percent $ZrO_2$ | Viscosity (mPa · s) | |
|---|---|---|
| | 4.8 g/L HPG + 1.2 g/L BAC | 4.8 g/L HPG |
| 0.0 | 9,480 | 720 |
| 0.1 | 45,400 | 2,200 |
| 0.2 | 46,800 | 3,400 |
| 0.6 | 48,000 | 3,200 |
| 1.0 | 57,600 | 6,000 |
| 2.0 | 63,200 | 9,000 |

Based upon the experimental results shown in Table 13, the preferred zirconate concentration is about 0.6%. Consistent with the other crosslinked fracturing fluids containing BAC, zirconate crosslinked fracturing fluids containing BAC demonstrated significant, and in some cases more than ten-fold, increases in viscosity over zirconate crosslinked fracturing fluids that do not contain BAC. The viscosity measurements also indicate that the addition of BAC permits the use of lower concentrations of zirconates. Other zirconate compounds, such as sodium zirconium lactate or ammonium zirconyl carbonate could be substituted.

EXAMPLE 15

Shear Stability of Zirconate Crosslinked Fracturing Fluids

To demonstrate additional benefits of incorporating BAC into zirconate crosslinked fracturing fluids, fracturing fluids comprising 0.6% $ZrO_2$ and 4.8 g/L HPG, with and without 1.2 g/L BAC, were prepared as described above. Various fracturing fluid compositions were then subjected to increasing periods of shear in a Waring Blender. The viscosity was measured at the end of each shearing interval with a Brookfield Viscometer at 0.5 rpm. The viscosities shown in Table 14 demonstrate that the addition of BAC protects zirconate crosslinked gels from shear damage and allows them to reheal.

TABLE 14

| Shear Interval in minutes | Viscosity (mPa · s) | |
|---|---|---|
| | 4.8 g/L HPG + 1.2 g/L BAC | 4.8 g/L HPG |
| 1 | 58,800 | 26,000 |
| 3 | 62,000 | 30,000 |
| 5 | 59,600 | 14,000 |
| 10 | 65,600 | 14,400 |
| 20 | 59,200 | 15,200 |
| 30 | 62,400 | 12,800 |

EXAMPLE 16

Viscosity Characteristics and Shear Stability of Titanate Crosslinked Fracturing Fluids Like zirconate crosslinked fracturing fluids, conventional titanate crosslinked fracturing fluids are shear sensitive, frequently do not reheal, and may stop transporting proppant efficiently under elevated shear conditions. Elaborate mixing schemes using delayed crosslinking agents are generally employed to make effective titanate crosslinked fracturing fluids. TYZOR TM 131 is a spontaneously crosslinking commercial aqueous titanate chelate made by DuPont. Fracturing fluids having concentrations of 2.4 to 6.0 g/L gellant, 1 mL/L TYZOR TM 131, with and without 0.3 to 1.2 g/L BAC, were prepared and their viscosities were measured. Consistent with other BAC crosslinked fluids, TYZOR TM 131 crosslinked fracturing fluids comprising BAC demonstrated significantly higher viscosities compared to TYZOR TM 131 crosslinked fracturing fluids that did not contain BAC.

To demonstrate additional benefits of incorporating BAC into TYZOR TM 131 crosslinked fracturing fluids, fracturing fluids comprising 1 mL/L TYZOR TM 131 and 4.8 g/L HPG, with and without 1.2 g/L BAC, were prepared. Each fracturing fluid composition was subjected to increasing shear intervals in a Waring Blender. The viscosity was measured at the end of each shear interval with a Brookfield Viscometer at 0.5 rpm. The results are presented in Table 15 and show that the addition of BAC inhibits shear damage, preserving sufficient viscosity for the transport of proppant.

TABLE 15

| Shear Interval in minutes | Viscosity (mPa · s) | |
|---|---|---|
| | 4.8 g/L HPG + 1.2 g/L BAC | 4.8 g/L HPG |
| 1 | 280,000 | 250,000 |
| 3 | 104,000 | 64,000 |
| 5 | 82,000 | 58,400 |
| 10 | 73,000 | 61,000 |
| 20 | 56,000 | 26,800 |
| 30 | 56,800 | 26,000 |

EXAMPLE 17

Proppant Transport Properties of Titanate Crosslinked Fracturing Fluids

The TYZOR TM 131 crosslinked fracturing fluids described in Example 16 were tested for their ability to effectively retain proppant in suspension under dynamic conditions using the hydraulic fracturing shear simulation apparatus described in Example 13. One mL/L TYZOR TM 131 in 2% KCl was used.

Figure 3A:
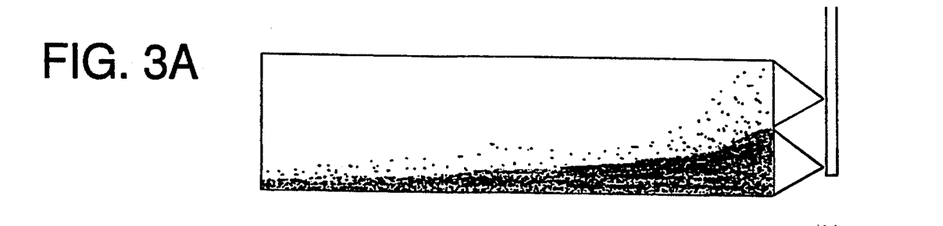
FIGS. 3A and 3B are diagrammatic representations of experimental test results showing proppant suspension in TYZOR TM 131, crosslinked fracturing fluids at 65.6° C. The fracturing fluid depicted in FIG. 3B additionally comprises bacterial cellulose, while the fracturing fluid represented by FIG. 3A does not incorporate bacterial cellulose.
Figure 3B:
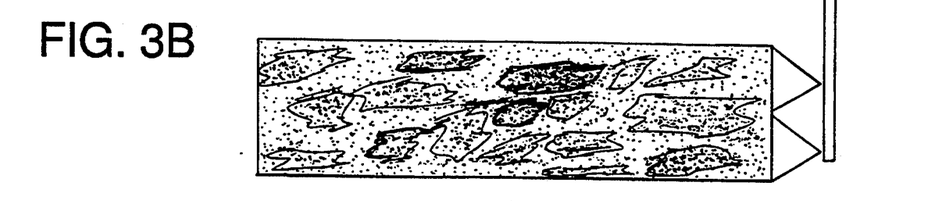

FIGS. 3A and 3B show the appearance of the slot flow device containing TYZOR TM 131 crosslinked HPG fracturing fluids, with and without BAC, at 65.6° C. FIG. 3A is a representation of the slot flow device containing TYZOR TM 131 crosslinked fracturing fluid. FIG. 3B is a representation of the slot flow device containing a TYZOR TM 131 crosslinked HPG/BAC fracturing fluid. The addition of BAC to the TYZOR TM 131 crosslinked fracturing fluid significantly inhibits the proppant from settling. The large chunks of material shown in FIG. 3B are relatively more solidified gellant portions.

It will be readily apparent that many departures can be made from the embodiments shown in the examples while still remaining within the general scope of the invention. Thus, the invention should be considered as being limited only as it is defined in the following claims.

We claim:

1. A method of preparing a hydraulic fracturing fluid composition which comprises:
   providing an aqueous transport medium;
   increasing the viscosity of the medium by dispersing sufficient amounts of gellant and a bacterial cellulose in said medium;
   crosslinking the fracturing fluid by adding a sufficient amount of a crosslinking agent; and
   suspending proppant particles in said medium whereby said bacterial cellulose decreases the settling rate of the proppant particles prior to and during transport into a drill hole and fractured geologic formation.

2. The method of claim 1 in which the bacterial cellulose is produced by a cellulose generating strain of the genus Acetobacter grown in an agitated culture.

3. The method of claim 2 in which said Acetobacter strain is selected from one resistant to mutation to non-cellulose producing types under agitated culturing conditions.

4. The method of claim 1 in which the bacterial cellulose is present in an amount of 0.12–4.8 g/L of fracturing fluid.

5. The method of claim 4 in which the bacterial cellulose is present in an amount of about 0.60–1.8 g/L of fracturing fluid.

6. The method of claim 1 in which the gellant is selected from the group consisting of guar, hydroxypropyl guar, carboxymethylhydroxypropyl guar, xanthan, hydroxyethyl cellulose, carboxymethylhydroxyethyl cellulose, and hydroxypropylmethyl cellulose and mixtures thereof.

7. The method of claim 6 in which the gellant is present in an amount of 2.4–6.0 g/L of fracturing fluid.

8. The method of claim 1 in which the crosslinking agent is selected from a group consisting of borates, zirconates, titanates, aluminates, chromates and mixtures thereof.

9. The method of claim 1 in which the crosslinking agent is selected from a group consisting of disodium octaborate tetrahydrate and aqueous titanate chelates.

10. A hydraulic fracturing fluid composition comprising:
    an aqueous transport medium;
    a gellant and a bacterial cellulose dispersed in said medium to raise the viscosity thereof;
    a crosslinking agent dispersed in said medium to crosslink the fracturing fluid; and
    proppant particles suspended in said medium whereby said bacterial cellulose decreases the settling rate of the proppant particles prior to and during transport into a drill hole and fractured geologic formation.

11. The composition of claim 10 in which the proppant is present in an amount of about 120–960 g/L.

12. The composition of claim 10 in which the bacterial cellulose is produced by a cellulose generating strain of the genus Acetobacter grown in an agitated culture.

13. The composition of claim 12 in which said Acetobacter strain is selected from one resistant to mutation to non-cellulose producing types under agitated culturing conditions.

14. The composition of claim 11 in which the bacterial cellulose is present in an amount of about 0.12–4.8 g/L of fracturing fluid.

15. The composition of claim 14 in which the bacterial cellulose is present in an amount of about 0.60–1.8 g/L of fracturing fluid.

16. The composition of claim 11 in which the gellant is selected from the group consisting of guar, hydroxypropyl guar, carboxymethylhydroxypropyl guar, xanthan, hydroxyethyl cellulose, carboxymethylhydroxyethyl cellulose, and hydroxypropylmethyl cellulose and mixtures thereof.

17. The composition of claim 16 in which the gellant is present in an amount of 2.4–6.0 g/L of fracturing fluid.

18. The composition of claim 10 in which the crosslinking agent is selected from a group consisting of borates, zirconates, titanates, aluminates, chromates and mixtures thereof.

19. The composition of claim 10 in which the crosslinking agent is selected from the group consisting of disodium octaborate tetrahydrate and aqueous titanate chelates.

20. A method of fracturing a geological formation using the fracturing fluid composition of claim 11, comprising:
    drilling a drill hole which passes into said formation; and
    delivering the hydraulic fracturing fluid into the drill hole and to the formation at a sufficient volumetric rate and pressure to cause fracturing and initiate and maintain cracks in said formation.

* * * * *